Patented May 4, 1937

2,079,350

UNITED STATES PATENT OFFICE 2,079,350

PIGMENTED PRODUCTS

Maldwyn Jones, Walter Fairbairn Smith, and Alexander Stewart, Blackley, Manchester, England, assignors to Imperial Chemical Industries Limited, a corporation of Great Britain No Drawing. Application March 8, 1935, Serial No. 10,128. In Great Britain March 8, 1934

9 Claims. (Cl. 106—23)

This invention relates to a new process for coloring rubber and rubber-like materials and more particularly refers to pigmented products which are especially adapted for use in the coloring of rubber, and processes for the production of such products.

Heretofore rubber and rubber-like materials have been colored by directly adding thereto pigments, and mechanically mixing the ingredients i. e. rubber, pigment, fillers, etc. In order to obtain a uniformly colored product it has been necessary to apply the pigment in the form of a fine powder. This has been aided to a certain extent by the use of various dispersing agents and related materials. It is, however, subject to the great disadvantage that the fine powders are difficult to manufacture and because of their propensities to dust are exceedingly inconvenient to use.

Finely divided coloring matters, as is well known, may be readily obtainable as aqueous suspensions containing about 80-90% water. The incorporation of water containing substances into rubber is, unfortunately, regarded with great disfavor in the rubber trade. Solutions or suspensions of coloring materials in an organic medium are also looked upon with disfavor. The net result of this state of affairs is that the most convenient method of obtaining and applying finely divided pigments cannot satisfactorily be used because of the deleterious effect upon the resulting colored article. Moreover, the application of dry pigment powders to rubber, even though dispersing agents, etc., are used, is unsatisfactory because of the difficulties of obtaining the dry powder, the difficulties of incorporating it in the rubber, and the difficulties of obtaining a uniformly colored product.

It is an object of the present invention to avoid the aforementioned difficulties, and other objections which directly or indirectly result therefrom. A further object is to devise a process wherein rubber and rubber-like materials may be uniformly and economically colored. A still further object is to produce sheets or blocks of pigmented materials which are quite stable, which may be stored for long periods of time, and which may be incorporated in rubber and rubber-like materials with the greatest of ease. A still further object is to produce sheets or blocks of pigmented material which may be added to rubber and mechanically mixed therewith to produce a final product of uniform color. A still further object is to produce colored rubber without the necessity of using dry pigments. A still further object is to produce colored rubber without the necessity of using aqueous or organic solutions or suspensions of pigments in the manufacture of the rubber articles. A still further object is to devise a process wherein the conveniently obtained suspensions or solutions of pigments may be utilized in the production of colored rubber articles without the deleterious effects which come from adding such suspensions or solutions directly to the composition which is processed into the ultimate article. Additional objects will become apparent from a consideration of the following description and claims.

These objects are attained according to the herein described invention which broadly relates to the coloring of rubber and rubber-like materials by mixing therewith a finely divided suspension or paste of pigment in the presence of a fatty material which is substantially solid at room temperature but is liquid at the temperature of the mixing operation. In a more restricted sense this invention is directed to the coloring of rubber by mixing therewith a pigmented article, this pigmented article being obtained by intimately mixing an emulsion of latex with a suspension or paste of pigment in the presence of a fatty material which melts at about 50° C., the resulting mixture being dried to approximately constant weight before the product is ready for use as a coloring medium. In its preferred embodiment this invention pertains to the production of colored rubber articles by utilizing as a color medium for said articles a pigmented product which is produced by intimately mixing an emulsion of latex with a pigment paste and stearic acid in the presence of a protective colloid such as sodium cetyl sulfate or related surface active materials.

The invention may be more readily understood by a consideration of the following illustrative examples, in which the quantities are stated in parts by weight:

*Example 1*

139 parts of Monolite Green B as aqueous paste of 18% solids (equivalent to 25 parts of dry pigment) and having an average particle size of ½ mu–2 mu as obtained in the usual course of manufacture, were heated in a steam jacketed pan provided with a stirrer to 60–90° C. 12 parts of commercial stearic acid were melted and stirred into the heated paste, 3⅓ parts of a 15% aqueous solution of the sodium salt of the sulfuric ester of cetyl alcohol were then stirred in, followed by 20½ parts of 60% rubber latex (as sold under the trade name of Jatex) and the mixture well stirred at 60-70° C. for one hour. The mixture was transferred to trays and dried in an oven at 60-70° C. until the weight was constant; this required about 48 hours.

The dry product was then sheeted out on a roller mill.

A dark green product was obtained, which had a clean slightly waxy surface which did not color the hands and which could be handled without breaking, and broke easily when sharply bent. It dispersed rapidly and easily into the rubber on the roller mill giving uniform effects free from speckiness.

Example 2

460 parts of Monolite Green B paste containing the equivalent of 75 parts of dry pigment were mixed with 1½ parts of cetyl sodium sulfate, 61½ parts of a 60% emulsion of rubber latex were added and the mixture was warmed to 60° C. 36 parts of commercial stearic acid (M. P. about 50° C.) was heated to 60° C. and added in a thin stream. The mixture was then stirred until uniformly mixed. Throughout the mixing process the mixture remains sufficiently fluid to mix easily. The mixture was transferred to trays and dried in a stream of air at 60-100° C.

75 parts of dry product was charged onto a 60 inch rubber roller mill in 5 minutes. The material quickly formed into a soft uniform sheet, this was mixed on the mill for a further 5-8 minutes and then removed and formed into suitable shapes by means of a stamping or other device.

Carnauba wax, spermaceti wax and beeswax, pure stearic acid, cetyl alcohol, petroleum jelly or tallow, may be used instead of commercial stearic acid. The products obtained differ in hardness, that with carnauba wax has a good surface gloss and is the hardest, that with tallow is the softest.

The products can be used for either hard or soft mixes, for example, 1-2% coloring matters may be used with the following mixtures:

| Soft mix | Parts | Hard mix | Parts |
|---|---|---|---|
| Rubber | 100 | Rubber | 100 |
| Zinc oxide | 5 | Zinc oxide | 5 |
| Lithopone | 2 | Lithopone | 2 |
| Blanc fixe | 50 | Blanc fixe | 100 |
| Stearic acid | 1 | Stearic acid | 2 |
| Sulfur | 2.25 | China clay | 100 |
| Accelerator | 0.5 | Sulfur | 2.5 |
| | | Mercaptobenzthiazole | 0.75 |

Example 3

300 parts of Monolite Red R paste (Color Index No. 189) containing the equivalent of 75 parts of dry pigment were mixed with 11 parts of cetyl sodium sulfate and warmed to 60° C. 12 parts of molten commercial stearic acid were added slowly and then 20 parts of 60% rubber latex, and the mixture stirred until uniform.

The wet mixture was dried on trays in a stream of air at 60° C. and the dry product milled on a rubber roller mill. The product contained 75% of pigment.

Example 4

375 parts of Indigo LL 20% paste (Color Index No. 1177) containing the equivalent of 75 parts of dry Indigo were mixed with 2 parts of the product obtained by condensing sulfonated naphthalene with formaldehyde and 61½ parts of 60% rubber latex emulsion. The mixture was warmed to 60° C. and 36 parts of molten commercial stearic acid (M. P. 50° C.) were added in a slow stream and the mixture stirred for 20 minutes.

The product was transferred to trays and dried in a stream of air at 100° C. in about 12 hours. It was then sheeted on a roller mill as before.

Example 5

The process described in Example 4 was applied to Caledon Blue R paste (Color Index No. 1106) the 375 parts of Indigo LL 20% paste being replaced by 278 parts of Caledon Blue R paste containing the equivalent of 75 parts of dry pigment.

Example 6

280 parts of a finely dispersed suspension of Durindone Blue 4BC (Color Index No. 1184) containing the equivalent of 70 parts of dry dyestuff (and which had been prepared by dissolving the dry dyestuff in 100% sulfuric acid, pouring onto ice and water, filtering and washing with water and 1% sodium hydroxide solution until faintly alkaline, and then milling with the condensation product of formaldehyde and sulfonated naphthalene) were mixed with 58 parts of rubber latex (60%) 1 part of the condensation product of formaldehyde and sulfonated naphthalene and 34 parts of commercial stearic acid at 60° C., until a uniform product was obtained. The mixture was dried at 60° C. and sheeted on a rubber roller mill.

It is to be understood that the aforementioned examples are illustrative merely of a few of the many methods of carrying into practical effect the teachings of the present invention. The individual reactants, the proportions thereof, and the conditions of reaction may be varied widely without departing from the scope of this invention.

In place of the pigments referred to in the above examples it is contemplated that any other pigment or pigments which have heretofore been used in the coloring of rubber or are capable of such use may be utilized herein. Two or more pigments may, likewise, be substituted for an individual pigment in accordance with the instructions of the present invention. A few representative pigments which are particularly adapted for use herein are: Vulcatex Yellow GGS, Blue AGS, Green LGS, Scarlet GGS, Orange RGS, Claret RGS, Red 2 RGS, Yellow 2 GGS, and Blue WGS.

Fatty materials which are capable of use herein should be substantially solid at room temperature but liquid at the temperature of the mixing operation. Moreover, a mixture of fatty materials having the aforementioned desired characteristics may be used in place of a single material of this character. By means of mixing such materials the valuable characteristics of one which may not by itself have the desired melting point and volatility may be imparted to the article by mixing therewith one or more additional materials which affect the melting point of the material in question. Fatty materials are well known to one familiar with the art and need not be discussed in detail herein. Suffice it to say that they are ordinarily organic compounds containing one or more long hydrocarbon chains. They may be acids, esters, ethers, alcohols, etc.

For optimum results it is, in general, advisable to select a fatty material which melts at about 50° C. Materials coming within this range which are particularly suited for use herein are stearic acid, beeswax, spermaceti wax, carnauba wax, cetyl alcohol, petroleum jelly, tallow and the like. As mentioned supra, pure fatty materials may be used or the commercial products containing a mixture of several components. It is also contemplated that one or more pure materials or commercial products may be mixed together provided the resulting mixture has the necessary melting point and fluidity. Since the various fatty materials affect to a certain extent the properties such as hardness of the resulting article it is clear that the selection of any fatty material or a mixture thereof will depend to a certain extent upon the use which is to be made of the pigmented product. For example, if it is to be transported or stored in a warm climate for considerable periods of time before incorporation in the ultimate rubber articles, the fatty material selected should preferably be of such character that the pigmented product will not become soft and sticky during such transportation and storage. On the other hand, where the pigmented product is to be used almost immediately in the production of colored rubber articles this consideration is not so important. For optimum results over a wide range of conditions commercial stearic acid has been found to be particularly satisfactory.

While a protective colloid is not essential, it is frequently of considerable help herein. Protective colloids may be selected from almost any of the well known surface active agents. Compounds which have been found to be of considerable value in this connection are the water-soluble salts of sulfuric acid esters of normal primary alcohols having from about 12 to 18 carbon atoms. For example, the sodium sulfate salts of -lauryl, -myristyl, -cetyl, -stearyl, and -oleyl alcohols, or mixtures thereof are quite helpful for this purpose. It is, of course, understood that other protective colloids may be used in place thereof or in addition thereto.

The aforementioned fatty materials, pigments, and preferably protective colloids, are added to an emulsion of rubber or rubber-like materials. This emulsion is preferably of rubber latex. Although other related materials may be substituted therefor or used in admixture therewith. The particular order in which the materials are mixed together may be varied widely. Likewise, as previously mentioned, the proportions of the individual materials may be varied to a considerable extent. In general, it may be stated that the proportion of materials should be such that the dried pigmented product contains more than 50% of pigment. However, this figure is not mutually exclusive and is not intended as a limitation hereon.

After the individual components referred to above are intimately mixed the resulting mixture is dried to about constant weight. This may conveniently be effected by transferring the mixture to trays and drying in a stream of air at a temperature within the range of about 60 to about 100° C. When the weight of the mixture does not change upon further drying the product may be milled, for example on a roller mill, until it is uniform and the milled product then formed into sheets or cut into blocks or some other convenient shape. Attention is directed to the fact that the pigmented product after drying is referred to in the present specification and claims as substantially anhydrous. Substantially anhydrous is used in the sense that the product has reached a constant weight, and no further appreciable diminution in weight takes place by prolonging the air drying. In other words, it is not intended to mean that absolutely no water is present therein.

After a uniform product has been obtained and the material sheeted or cut into blocks or articles of other shape, these products may be stored until required in the production of colored articles. They are highly colored solids which are slightly elastic and have a toughness just sufficient to make them easy to tear deliberately. They are clean to the touch and mill readily into rubber on the roller mill. Moreover, in milling into rubber or rubber-like materials they develop full color value in uniform shades free from specks. By full color value is meant that color which is obtained from the same amount of color when present as a finely divided aqueous paste. When the pigmented products are made into sheets, blocks or other shapes they are of such character that the weight may be gauged from their size.

By means of the present invention a process has been devised for the economical production of pigmented articles. These articles may be stored for long periods of time and under a great variety of conditions without becoming sticky or otherwise difficult to handle. They may be readily and conveniently transported. Likewise, they are of such character that they may be incorporated with rubber and rubber-like materials without any difficulty. Upon incorporating these pigmented products into rubber or related materials they impart thereto a uniform color free from specks or other objectionable features. By means of this invention the inconvenience and expense of using dry pigment powders in the production of rubber pigmented articles is entirely obviated. Due to the ease with which the pigmented products described herein may be produced, and the ready availability of the components which enter into such products they are of paramount importance to the rubber industry.

As many apparently widely different embodiments of this invention may be made without departing from the spirit and scope thereof, it is to be understood that the invention is not limited to the specific embodiments thereof except as defined in the appended claims.

We claim:

1. A process for making stable, homogeneous compositions suitable for coloring rubber and rubber-like materials comprising colloidally dispersing in the presence of a protective colloid, a rubber-containing material, a finely-divided pigment, and a free fatty material which is substantially solid at room temperature but liquid at the temperature of the mixing operation, the fatty material and rubber content of said mixture being substantially equal in proportion, and drying the resultant mixture.

2. A process for making stable, homogeneous compositions suitable for coloring rubber and rubber-like materials comprising colloidally and directly dispersing in the presence of a protective colloid a rubber-containing material, a finely-divided pigment, and a free fatty material which is substantially solid at room temperature but liquid at the temperature of the mixing operation, the fatty material and rubber content of said mixture being substantially equal in proportion, and thence evaporating to constant weight the resultant mixture.

3. A process for making stable, homogeneous compositions suitable for coloring rubber and rubber-like materials comprising colloidally dispersing in the presence of a protective colloid a rubber-containing material, a finely-divided pigment, and stearic acid, the proportion of stearic acid and rubber in said mixture being substantially equal, and thereafter evaporating to constant weight the resultant mixture.

4. A process for making stable, homogeneous compositions suitable for coloring rubber and rubber-like materials comprising directly admixing, in the presence of a protective colloid, a rubber latex, a finely-divided pigment, and a free fatty material which is substantially solid at room temperature but liquid at the temperature of the mixing operation, the proportion of fatty material to rubber content of said mixture being substantially equal, and thereafter evaporating the resultant mixture to constant weight.

5. A process for making stable, homogeneous compositions suitable for coloring rubber and rubber-like materials which comprises forming a pasty mass suspension of pigment, protective colloid and free fatty acid, subsequently incorporating into said mass an amount of rubber latex substantially equal to the amount of said fatty acid, and thence drying the resultant mixture.

6. A process for making stable, homogeneous compositions suitable for coloring rubber and rubber-like materials directly which comprises initially forming a pasty mass suspension of finely-divided pigment, protective colloid and free fatty acid which melts at about 50° C., thereafter incorporating into said mass a latex emulsion in amount substantially equal to the amount of fatty acid present, drying the resultant product to constant weight and milling the dried product on a roller mill.

7. A process for making stable, homogeneous compositions suitable for coloring rubber and rubber-like materials directly which comprises initially forming a pasty mass suspension of pigment, stearic acid, and a protective colloid, subsequently incorporating into the resultant mass a latex emulsion in amount equal to the amount of stearic acid present in the original mixture, and thence drying the resultant product.

8. A process for making stable, homogeneous compositions suitable for coloring rubber and rubber-like materials directly which comprises initially forming a pasty mass suspension of pigment, free fatty acid which melts at about 50° C., and a protective colloid, subsequently incorporating into the resultant mass a latex emulsion in amount equal to the amount of fatty acid present in the original mixture, and thence evaporating to constant weight the resultant product.

9. A stable, homogeneous composition suitable for coloring rubber and rubber-like materials directly comprising a relatively uniform mixture of latex, a protective colloid, a finely-divided pigment, and a free fatty acid which is substantially solid at room temperature but liquid at the temperature of the mixing operation, the proportion of latex to fatty acid in said mixture being substantially equal by weight.

MALDWYN JONES.
WALTER FAIRBAIRN SMITH.
ALEXANDER STEWART.